Sept. 26, 1967  H. J. COUCH ET AL  3,343,867
VISOR MEANS

Filed June 17, 1965  4 Sheets-Sheet 1

INVENTORS
Harry J. Couch
Glenn L. Kinkead

*Albert W. Reutter*

Their Attorney

Sept. 26, 1967  H. J. COUCH ET AL  3,343,867
VISOR MEANS

Filed June 17, 1965  4 Sheets-Sheet 2

INVENTORS
Harry J. Couch
Glenn L. Kinkead

Albert H. Reuther
Their Attorney

Sept. 26, 1967 H. J. COUCH ET AL 3,343,867
VISOR MEANS
Filed June 17, 1965 4 Sheets-Sheet 3

INVENTORS
Harry J. Couch
Glenn L. Kinkead

Their Attorney

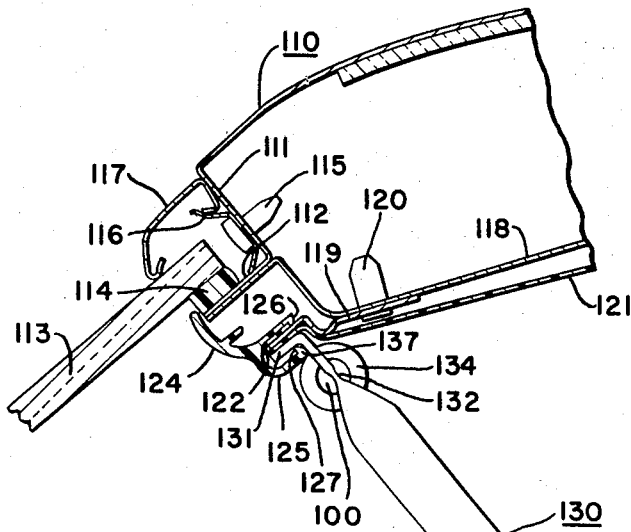
Fig. 13
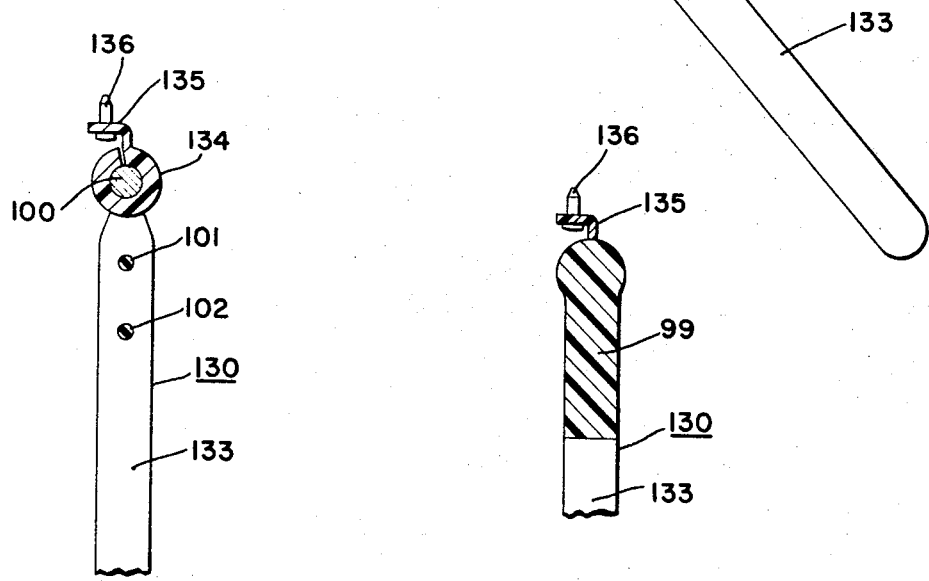
Fig. 14
Fig. 15
INVENTORS
Harry J. Couch
Glenn L. Kinkead
Their Attorney

United States Patent Office 3,343,867
Patented Sept. 26, 1967

3,343,867
VISOR MEANS
Harry J. Couch, Vandalia, and Glenn L. Kinkead, Farmersville, Ohio, assignors to General Motors Corporation, Detroit, Mich., a corporation of Delaware
Filed June 17, 1965, Ser. No. 464,792
3 Claims. (Cl. 296—97)

ABSTRACT OF THE DISCLOSURE

The subject matter of this invention is an adjustable vehicle sun visor of plastic material having integral body and hinge portions. Located on each side of the body portion and positioned in axial alignment with the hinge portion is a shaft member which is frictionally engaged by a corresponding annular member secured to the vehicle body.

---

This invention relates to vehicle visor means.

An object of the present invention is to provide an all foam vehicle sun visor means having an integral plastic hinge means for vehicle mounting.

Another object of the present invention is to provide an all polymer foam vehicle sun visor means having an integral plastic polypropylene hinge means for vehicle mounting.

A further object of this invention is to provide in combination on a vehicle visor means a plastic shade portion having at least one locking tab or projection complementary to multiple recessing in a carriage means. This carriage means of the insulating material has recessing in predetermined locations for variable visor positioning.

Another object of the present invention is to provide in a combination on visor means, a recessing for telescopic fit of an insert means as well as optional slots or pocketing for storage and positioning of mirror means, combs, pencils, credit cards, mileage charts or maps and other useful articles.

Another object of this invention is to provide in combination on visor means an integral plastic hinge means extending axially into a curved frictionally engaged plastic portion.

Further objects and advantages of the present invention will be apparent from the following description, reference being had to the accompanying drawings wherein preferred embodiments of the present invention are clearly shown.

In the drawings:

FIGURE 13 is a fragmentary sectional view similar to that of FIGURE 10.

FIGURES 14 and 15 are further fragmentary sectional views to show plastic friction members on structure of FIGURE 13 in accordance with the present invention.

At present, there are many pieces of hardware used for vehicle visor means installation. There can be two mounting pillars in a roof portion of a vehicle body. A relatively complex hinge arrangement is required to allow the visor means to be shifted into various positioning. Reference can be made to a Patent 3,151,907—Morgan issued Oct. 6, 1964 and belonging to the assignee of the present invention. This patent discloses relatively complex hinge arrangement including a rod which turns in the hinge. Also, present visor means structures require such complex hinge arrangement to permit adjustment of the visor means either to a side window or to a front or windshield portion of the vehicle. In either side or front positioning, such visor means can be adjusted into positioning either out of line of vision or into a vision-shielding location so far as the eyes of a vehicle occupant or operator are concerned. In addition to use of a rod that turns in the hinge, there can be reinforcement with hardboard as well as wiring covered by suitable fabric or insulating material. Generally only a pair of visors are provided having a centrally located locking structure therebetween. Each of the visor means when in a forward or windshield position generally has a latching end which carries part of the visor load. Since all of this hardware is expensive, elimination thereof can reduce visor cost appreciably.

Figure 1:
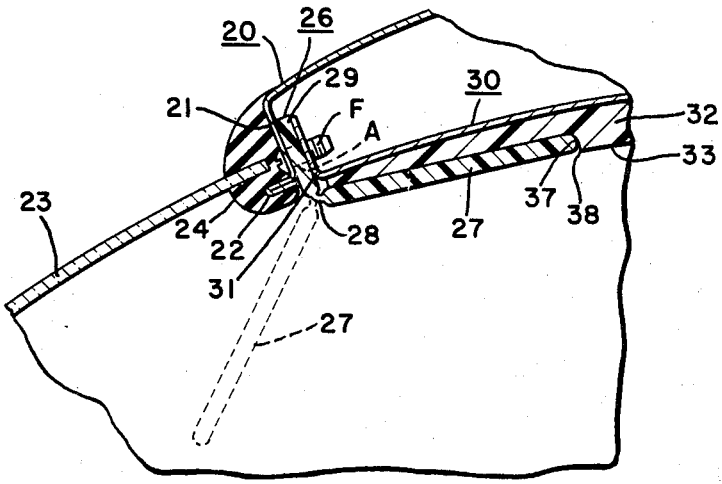
FIGURE 1 is a fragmentary view showing vehicle visor means installation in accordance with the present invention.

In FIGURE 1 there is shown a vehicle means roof support portion generally indicated by numeral 20. This support portion 20 includes a downwardly extending flange 21 having a dent end 22. A suitable window or windshield means 23 can be secured by a mounting portion 24 relative to the downward portion 21 and end 22. Specific mounting of the window or windshield means 23 can be varied in any suitable manner depending upon a particular vehicle installation. The mounting portion 24 provides both resilient mounting and a weather seal between the glass and frame or support portion 20 collectively.

As further shown in FIGURE 1, the vehicle can be provided with a visor means generally indicated by numeral 26. This visor means 26 includes a main body or visor portion 27 as well as an intermediate though integral hinge portion 28 of reduced thickness carried by a flap portion 29. The flap portion has a plurality of apertures "A" through which a plurality of fasteners "F" are fitted as represented in FIGURE 1. These fasteners "F" can be threaded members or rivets which fit complementary to openings in the downward portion 21 in locations complementary to the apertures "A."

A backing member generally indicated by numeral 30 includes a lateral flange 31. The fasteners "F" can be secured to this flange portion 31 also. Thus, the flap portion 29 of the visor means becomes laminated or sandwiched in place between the downward portion 21 and the flange portion 31 as shown in FIGURE 1. The backing member 30 carries a foam insulating material 32 thereon. This foam material 32 adheres to the backing member 30 with a suitable surface texture and coloring. A surfacing 33 of this foam material 32 thus is molded to a predetermined configuration as a headliner or vehicle interior trim.

Figure 3:
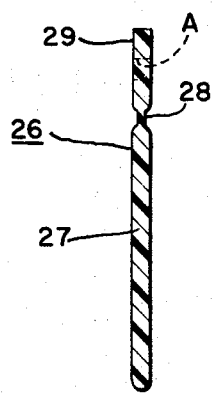
FIGURE 3 is a cross-sectional view taken along line 3—3 in FIGURE 2.

The foam headliner material 32 has a recessing 37 therein substantially complementary to the visor portion 27. The visor portion 27 thus fits flush as to the surfacing 33 during positioning of the visor means portion 27 in a retracted or out of line of vision positioning represented in FIGURE 1. An abutment 38 can be formed subject to resilient displacement for latching of the edging of the visor portion 27. Thus during out of line of sight positioning, the visor portion 27 does not protrude in a location where it would appear unsightly or in the way so far as occupant comfort is concerned during vehicle operation when bright light from natural or artificial sources need not be shielded against entry into the vehicle passenger compartment. The use of the recessing 37 and latch portion 38 in the foam headliner material 32 in combination with the reduced-thickness hinge portion 28 permits elimination of costly hardware. The visor portion 27 is molded of a suitable plastic material such as polypropylene foam material for example that is compatible and integral with the hinge portion 28 and flap portion 29. The hinge portion 28 and flap portion 29 are made of propylene plastic material. In FIGURE 1 a phantom or outline positioning of the visor portion 27 in a lowered positioning or for shielding in a line of vision is illustrated. The reduced-thickness hinge portion 28 best seen in views of FIGURES 1 and 3 permits such pivotal movement of the visor portion 27 relative to the flap portion 29 in a unitary part. The flap portion 29 is readily mounted and secured for support from the downward portion 21 or garnish molding of the vehicle as shown in FIGURE 1.

Figure 2:
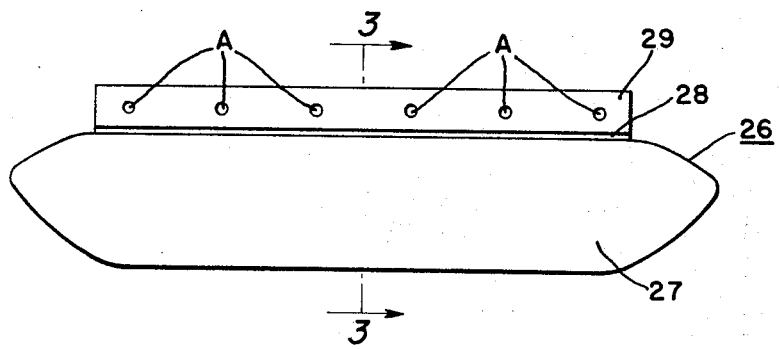
FIGURE 2 is a plan view of the visor means of FIGURE 1.
Figure 4:
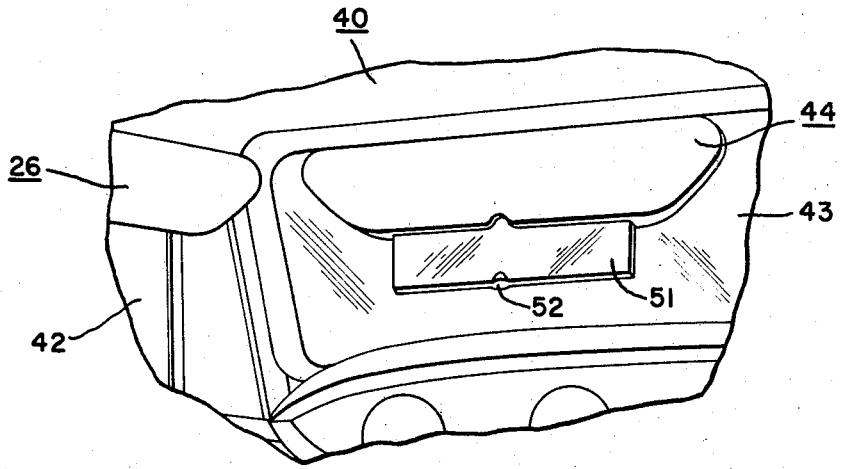
FIGURE 4 is a fragmentary perspective view of further visor means installation in accordance with the present invention.
Figure 5:
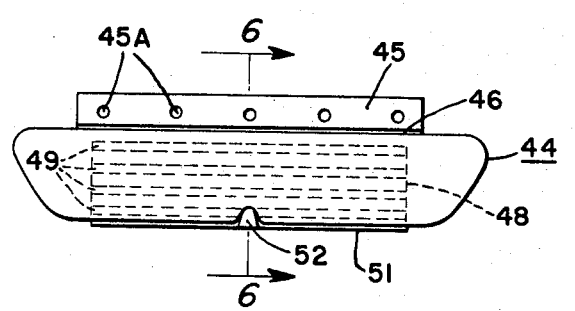
FIGURE 5 is a plan view of the visor means of FIGURE 4.
Figure 6:
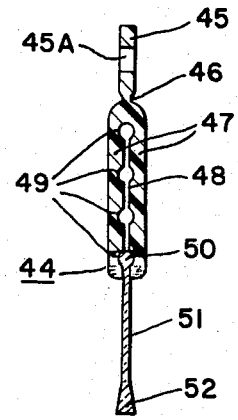
FIGURE 6 is a cross-sectional view taken along line 6—6 in FIGURE 5.

Cost advantages of an all-plastic visor means make it possible to provide a four-visor vehicle installation. In FIGURE 4 there is shown a vehicle means generally indicated by numeral 40 in which visor means in accordance with the present invention are shown in a paired relationship for one side of the vehicle. It is to be understood that a similar paired relationship exists for visor means on an opposite side of the vehicle. A dashboard means 41 is provided inside the vehicle. The vehicle 40 of FIGURE 4 further includes side glass or window means 42 as well as a front or windshield means 43. The visor means 26 of FIGURES 1–3 inclusive can also be mounted in a side window location as represented in FIGURE 4. A further visor means generally indicated by numeral 44 in FIGURES 4, 5 and 6 can be installed adjacent to a front window location. This visor means 44 includes a flap portion 45 of plastic material as well as a reduced thickness hinge portion 46 integral with a plastic bifurcated body portion indicated by numeral 47. The visor portion 47 differs from that designated by reference numeral 27 in that a substantially U-shaped cross section is provided as represented in FIGURE 6. Suitable aperturing 45A can be provided in the flap portion for mounting purposes in a manner similar to that illustrated in FIGURE 1. The body portion 27 as bifurcated into a U-shaped configuration has a central cavity or recessing 48. A plurality of enlarged spaces 49 are included with the recessing 48. These enlarged spaces 49 are substantially parallel to each other as represented in FIGURES 5 and 6 of the drawings. The recessing and enlarged spaces are complementary to a beaded edging 50 of an auxiliary visor portion 51 having an enlarged grip or handle portion 52 centrally thereof as shown in views of FIGURES 5 and 6. The auxiliary visor portion 51 is thus slidably adjustable into multiple telescopic locations relative to the visor portion 47 having the U-shaped configuration of plastic material. The auxiliary visor portion 51 can be made of a tinted or darkened translucent material to serve as a further shield against glare of bright lights or sun rays which may enter through a front or windshield portion of the vehicle 40. The visor means combination 44 provides an all-plastic assembly from which hardware is eliminated for reduction in cost.

The auxiliary visor means or portion 51 of FIGURES 4, 5 and 6 can slide into and out of telescopic relationship with the visor portion 48 so that there is adjustment for difference in height of eye location for short and tall occupants or passengers. The auxiliary visor portion 51 can be extended into various telescopic or exposed positions. Also the auxiliary visor portion 51 can be removed completely if so desired. The plastic material of the U-shaped configuration of visor portion 47 is sufficiently resilient and flexible to permit temporary flexing to increase the widths of the recessing 48 during shifting of the auxiliary visor portion 51 into various positions.

Figure 7:
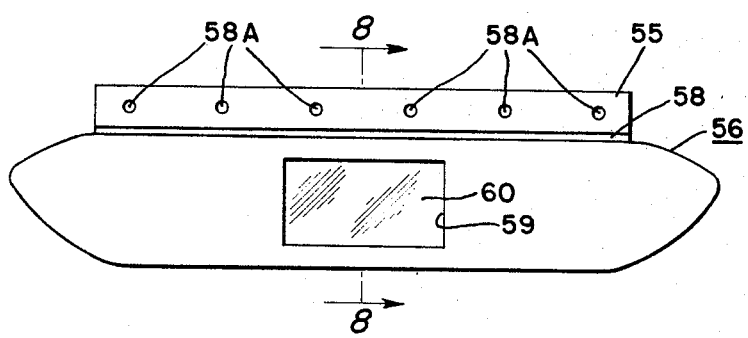
FIGURE 7 is a plan view of another visor means having features in accordance with the present invention.
Figure 8:
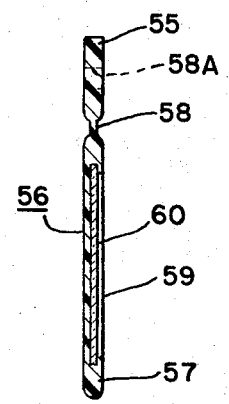
FIGURE 8 is a cross-sectional view taken along line 8—8 in FIGURE 7.

In FIGURES 7 and 8 of the drawings a further visor means generally indicated by numeral 56 is shown and includes a visor portion 57, a hinge portion 58 of reduced thickness as well as a flap or mounting portion 55 having aperturing 58A. In accordance with the present invention the visor portion 57 has a centrally located recessing 59 undercut along edging to receive a mirror means 60. Such vanity mirror means 60 is thus supported in a flush mounting or molded in relation to the plastic visor means 56 particularly in the visor portion 57 thereof. The plastics vanity mirror means 60 can be made in accordance with disclosure of copending patent applications Serial No. 212,662—Prance et al. and Serial No. 212,695—Merica both filed July 26, 1962 and belonging to the assignee of the present invention. It is to be understood that the visor means 57 can also have molded slots or pockets for combs, credit cards, pencils, as well as mileage charts and other useful items. It is to be understood that the visor means 44 and 56 can also be mounted to fit flush into recessing of headlining material made of molded foam plastic as described for FIGURE 1. In each of the instances of FIGURES 1 through 8 inclusive a flap portion as well as an integral reduced-thickness hinge portion is provided with the integral visor portion.

Advantages of a polypropylene foam sun visor means include low cost and removal of hinge hardware by provision of the molded hinge. Use of a molded surface texture permits elimination of sewing a cloth or cardboard covering in place on the visor means. The use of four visors provides more sun and glare protection. Slide-movable panels can be inserted as to visor portion structure. Also, molded-in mirror and other sections can be readily provided. Surface coatings and textures can be molded to match headliner or vehicle interior decorations.

Figure 9:
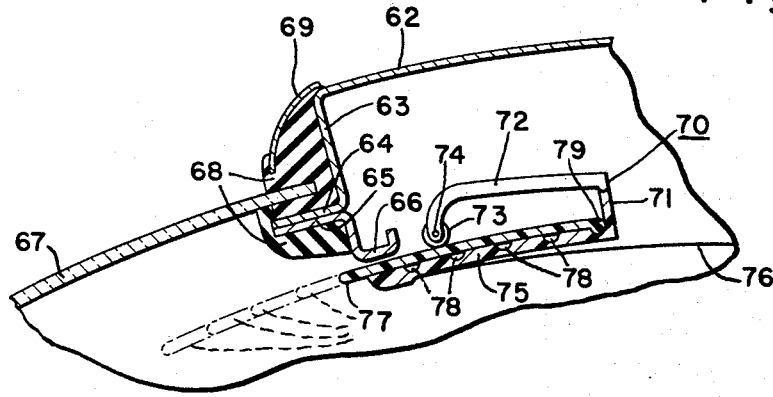
FIGURE 9 is a fragmentary sectioned view of another vehicle visor means installation in accordance with the present invention.

FIGURE 9 of the drawings shows a modified version of visor means similar to that of FIGURES 4, 5 and 6 of the drawings. In FIGURE 9 there is shown a vehicle roof portion 62 having a laterally inwardly extending flange 63 and ending 64. A garnish molding flange portion 65 can be secured to the ending 64. The garnish molding flange portion 65 is integral with a substantially J-shaped portion 66. A windshield means or transparent viewing area 67 of plastic material can be suitably mounted by means of resilient material 68 fitted to opposite sides of the paneling 67 of the windshield. The resilient material 68 is also tightly in sealing engagement with the ending 64 and flange portion 65 of the garnish molding. A trim covering of simulated metal designated by numeral 69 can be added. This trim covering 69 can be in accordance with disclosure of Patent 3,082,491—Millhouse et al. issued Mar. 26, 1963 to the assignee of the present invention. Further in FIGURE 9, the visor means generally indicated by numeral 70 includes a substantially U-shaped body portion 71 having an arm 72 or flange portion that carries roller means 73 journaled by pins 74. The U-shaped body portion 71 also includes a side portion 75 to which headliner means 76 can be secured by suitable adhesives or other bonding material. The side portion 75 includes a plurality of grooves 78 substantially parallel to each other. An insert or slidable member 77 substantially complementary to the side portion 75 is provided with an enlarged beaded end 79 which fits complementary to the grooves 78 in a plurality of locations as outlined in FIGURE 9. The roller means 73 journaled by the pin means 74 is resiliently biased by the flange or arm portion 72 into engagement with the insert or visor portion 77 which is slidably adjustable into various positions either retracted out of line of vision or lowered into a vision shielding positioning as required by a vehicle occupant or operator. Weight of the visor portion 77 is added to the biasing force of the arm or flange portion 72 with the roller 73 and pivot 74 thereon. It is to be understood that a vehicle dashboard means similar to that designated by numeral 41 is to be provided below the windshield 67 in a well known manner. The interlocking engagement of the beaded portion 79 as to the grooving 78 assures a locked positioning particularly since the roller means 73 engages one side of the visor portion 77 substantially centrally thereof. The visor portion 77 is substantially complementary to the side portion 75. The visor portion 77 and side portion 75 can have a semi-arcuate configuration or contour to complement curvature of the windshield means 67 if necessary.

The headliner portion 76 in FIGURE 9 can thus be made of a molded foam material and the visor means can slide out therefrom. Thus, in effect, the visor means 77 is again substantially flush and concealed as to the positioning thereof with the headliner portion.

Figure 10:
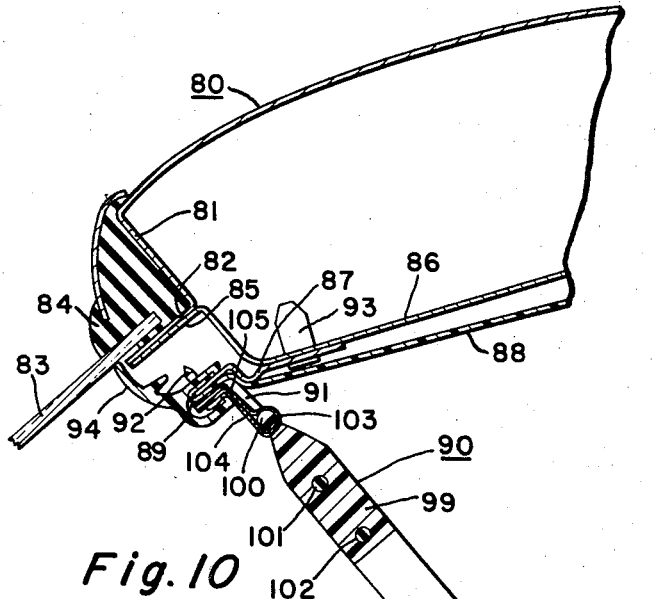
FIGURE 10 is a further fragmentary sectional view of vehicle visor means having features in accordance with the present invention.
Figure 11:
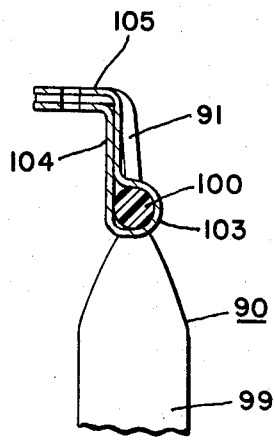
FIGURE 11 is an enlargement of a portion of structure in FIGURE 10.
Figure 12:
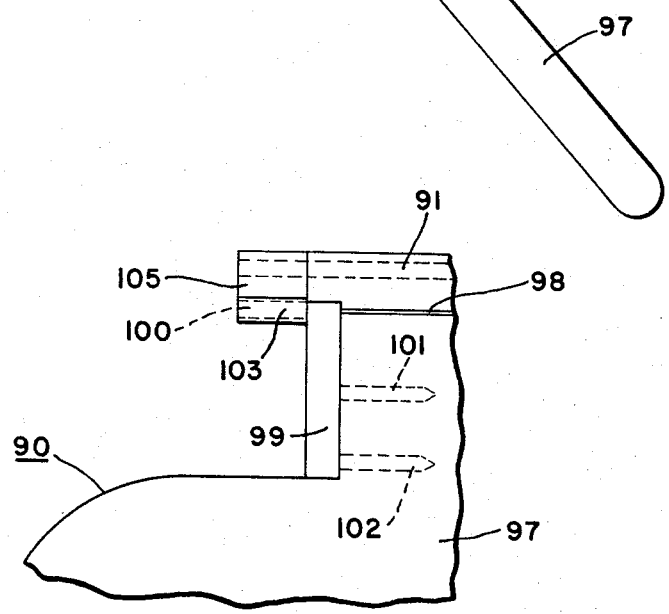
FIGURE 12 is a fragmentary plan view of structures in FIGURES 10 and 11.

In FIGURE 10 there is shown another portion of a vehicle means generally indicated by numeral 80 having an inwardly extending flange 81 and ending 82 on a roof portion thereof. A windshield means 83 is resiliently mounted by use of an elastomeric member 84 which sealingly engages the roof portion flange and ending as well as an interior flange portion 85. The flange portion 85 is carried by a mounting means 86 to which a bracket 87 is secured. Headliner means 88 can have a J-shaped ending 89 fitted to one end or edging of the bracket 87. A visor means generally indicated by numeral 90 includes a flap portion 91 held by fasteners 92 in assembled relationship with the bracket 87 as well as the J-shaped ending 89 of the headliner means. Suitable fasteners 93 can hold the bracket 87 as to the mounting member 96 on the vehicle. These fasteners 93 are concealed by the headliner means 88. A covering 94 of vinyl or elastomeric material can be fitted over the elastomeric mounting portion 84 as well as the fasteners 92 as assembled to the bracket 87. In addition to the flap portion 91 the visor means 90 includes a visor portion 97 as well as a reduced-thickness hinge portion 98 represented in FIGURE 12. In FIGURES 10, 11 and 12 there can also be seen a friction means added to the visor means 90. This friction means includes a first and second plastic or polyamide (nylon) member represented by numeral 99 having a main annular shaft-like extension 100 axially in alignment with the hinge portion 98. The nylon member 99 further includes a pair of projections 101 and 102 which are forced into the foam material of the visor portion as shown in views of FIGURES 10 and 12. A metal clip means having an annular end 103 frictionally in engagement with the shaft extension 100 is provided to include a pair of flanges 104 and 105 therewith. Each of the flanges 104 and 105 can have aperturing therethrough which is aligned with similar openings or apertures in the flap portion 91 and the J-shaped ending 89 of the headliner means to permit mounting thereof by fasteners 92 secured to the bracket 87. It is to be understood that such frictionally cooperable members 99 and clip 103–104–105 can be provided at each of opposite ends of the visor means 90 if necessary. The visor portion 97 is made of polypropylene foam material preferably and the friction member 99 including the shaft extension 100 thereof is made of polyamide or nylon material. The flap portion can be made of propylene formed integrally with the remainder of the visor portion.

FIGURES 13, 14 and 15 illustrate further modification of the frictionally engageable portions similar to those illustrated in FIGURES 10, 11 and 12. A roof portion generally indicated by numeral 110 for the vehicle can be provided with a laterally inwardly projecting flange portion 111 having an ending 112. A windshield means 113 is sealed to the ending 112 by suitable mastic or adhesive material 114. A fastening means 115 can hold a bracket 116 and trim or molding portion 117 in place between the vehicle roof portion and windshield 113. An interior mounting portion 118 has a bracket 119 held thereto by fasteners or rivets 120. A headliner means or fabric of plastic insulating material 121 has a J-shaped ending 122 thereof fitted around an edging of the bracket 119. An elastomeric or plastic garnish trim molding means 124 can include a U-shaped portion 125 having inwardly extending ends 126 and 127. An end 126 engages the J-shaped ending 122 of the head liner means. The member 124 conceals at least a portion of the mastic material 114 together with the ending 112 of the roof portion. A visor means generally indicated by numeral 130 includes a flap portion 131 as well as a reduced thickness hinge portion 132 and a visor portion 133. The visor portion 133 is made of polypropylene foam material as represented by each of the views in FIGURES 13, 14 and 15.

At opposite ends of the visor means 130 a plastic or polyamide (nylon) mounting member 99 is again fitted to the visor means. This plastic mounting member 99 includes a shaft extension 100 as well as opposite projections 101 and 102 in the same manner as illustrated in FIGURES 10, 11 and 12. However, in place of the metal clip means frictionally engageable with the shaft portion 100 there is shown in FIGURES 13 and 14 that an annular or eyelet-like friction member 134 is snugly fitted around the shaft extension 100. This friction member 134 can have a flange portion 135 through which suitable fasteners 136 are installed. Also a supplemental friction member of engagement of a corner 137 of the molding 124 can be provided in engagement with the eyelet-like or annular portion 134 as represented in FIGURE 13. FIGURE 15 provides in effect a cross section through the member 99 and shows the fastening 136 and flange or flap 135 therewith. It is to be understood that the eyelet-like portion 134 can be provided at each of opposite ends of the visor means together with a friction member 99 having the shaft extension 100 for frictional engagement therewith. In any event, the visor means 130 has the integral hinge portion 132. Use of the frictional members as illustrated in FIGURES 10–15 inclusive can be provided in place of the recessed headliner means represented in FIGURE 1 of the drawings.

Headliner means can be molded or shaped to a finished contour and placed within the vehicle in one piece. The headliner means can be made of materials exemplified by polypropylene foam, a rigid urethane foam, and a spring wire version with a flocked surface. If a propylene foam material is used a suitable coloring thereof can be provided either by painting or tinting of the material per se.

While the embodiments of the present invention herein disclosed constitute preferred forms, it is to be understood that other forms might be adopted.

What is claimed is as follows:

1. A visor means, comprising a body portion of plastic foam, a hinge portion of reduced thickness of plastic integrally secured to said body portion, a mounting flap portion integral with said hinge portion, a friction means including a shaft extension and a pair of projections forced into said plastic foam body portion, and an annular means in engagement with said shaft extension of said friction means, said annular means having a flap therewith joined together with said visor flap portion to a vehicle support bracket subject to pivotal movement as to said integral hinge portion and frictional engagement of said shaft extension coaxial with said hinge portion.

2. The visor means of claim 1 wherein said body portion is made of polypropylene foam material, said hinge and flap portions being made of propylene, said friction means being made of polyamide.

3. The visor means of claim 2 wherein said annular means is also of plastic material snugly in frictional engagement with said shaft extension and axially stabilized by said coaxial plastic hinge portion.

References Cited

UNITED STATES PATENTS

| 2,733,763 | 2/1956 | Nygaard | 296—97 X |
| 3,199,913 | 8/1965 | Field et al. | 296—97 |

FOREIGN PATENTS

| 1,295,506 | 5/1962 | France. |
| 854,938 | 11/1960 | Great Britain. |

BENJAMIN HERSH, *Primary Examiner.*

J. A. PEKAR, *Assistant Examiner.*